United States Patent
Brosilow

Patent Number: 5,518,088
Date of Patent: May 21, 1996

[54] SHIM STRUCTURE FOR SOUND DAMPENING BRAKE SQUEAL NOISE

[76] Inventor: Jerry L. Brosilow, 343 Teresita, San Francisco, Calif. 94127

[21] Appl. No.: 832,794

[22] Filed: Feb. 7, 1992

[51] Int. Cl.$^6$ .................................................. F16D 65/38
[52] U.S. Cl. .................. 188/73.37; 188/205 A; 188/250 E
[58] Field of Search .................. 188/73.35–73.37, 188/205 A, 250 R, 250 B, 250 E, 250 G, 264 G; 29/413

[56] References Cited

U.S. PATENT DOCUMENTS

| | | | |
|---|---|---|---|
| 2,733,474 | 2/1956 | Capitani | 29/413 X |
| 2,819,032 | 1/1958 | Detrie et al. | 267/153 X |
| 3,359,773 | 12/1967 | Stuchbery | 29/413 X |
| 3,885,651 | 5/1975 | Odier | 188/73.5 |
| 3,918,555 | 11/1975 | Rath | 188/73.5 |
| 4,093,045 | 6/1978 | Kawamura | 188/73.5 |
| 4,225,021 | 9/1980 | Kawamura et al. | 188/73.5 |
| 4,603,760 | 8/1986 | Myers | 188/73.37 |

FOREIGN PATENT DOCUMENTS 0211032  12/1983  Japan .................. 188/250 B

OTHER PUBLICATIONS

Specification sheets "Scotch Laminating Adhesive" 3M (8 pages).

*Primary Examiner*—Josie Ballato
*Attorney, Agent, or Firm*—Feix & Feix

[57] ABSTRACT

A shim structure for sound dampening brake squeal noise in a disc brake apparatus, when installed on the piston and/or caliper engaging surface of a steel backing plate of the friction pad structure, is composed of a sheet of aluminum and a continuous membrane of a high temperature acrylic adhesive on one surface only of the sheet of aluminum. The sheet of aluminum has a thickness large enough to provide, in combination with the membrane of high temperature adhesive, effective sound dampening of the brake squeal noise. In a specific embodiment of the invention, the silhouette periphery of the shim structure is shaped to closely match the silhouettes of a number of related but differently configured friction pad structures. In this embodiment the sheet of aluminum is partially cut through in certain locations to permit the areas of those locations to be popped out by underlying and upwardly projecting protuberances in the surface of the steel backing plate when the shim structure is pressed into engagement with the surface during installation. The pop-out areas permit one basic shim structure to be fitted to a plurality of friction pad structures having varied surface configurations.

8 Claims, 3 Drawing Sheets

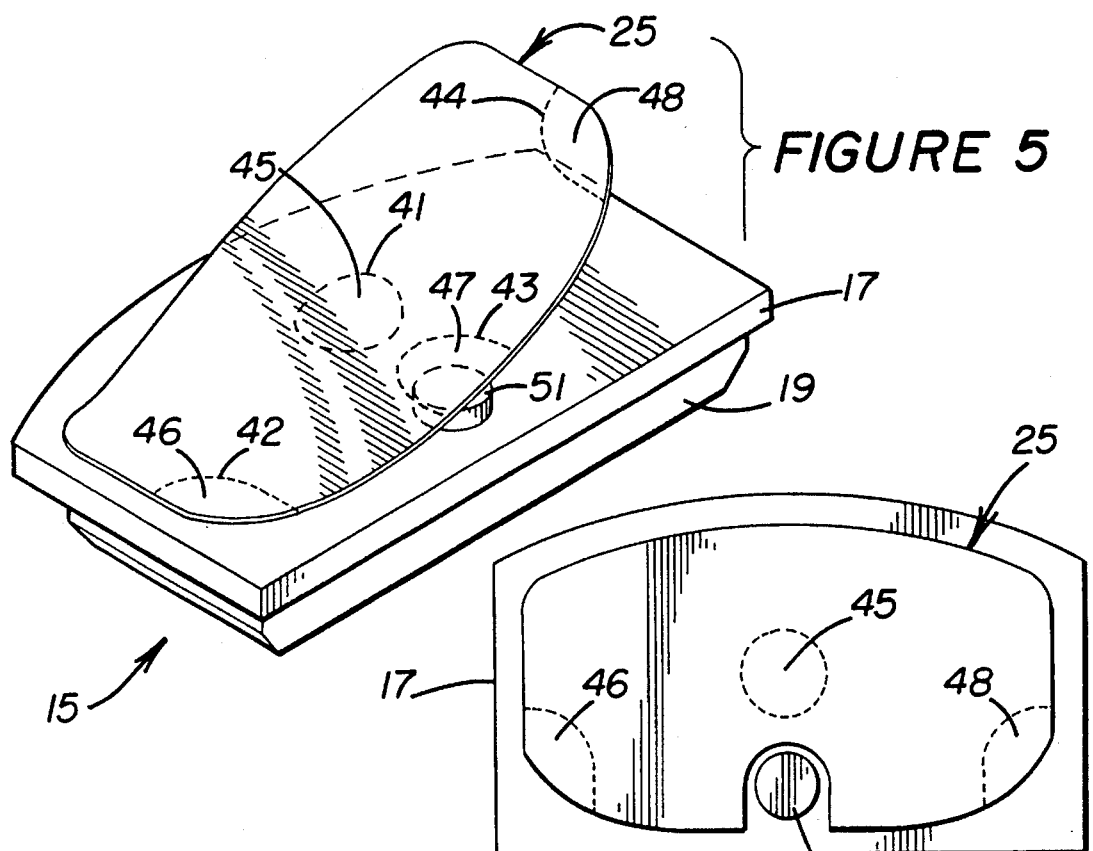
FIGURE 5
FIGURE 6
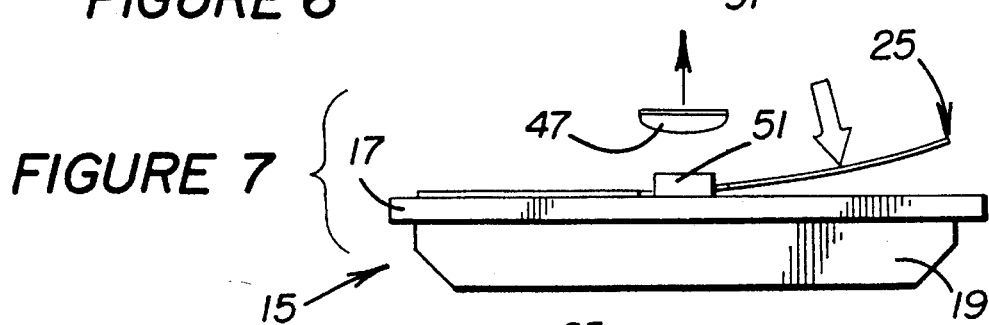
FIGURE 7
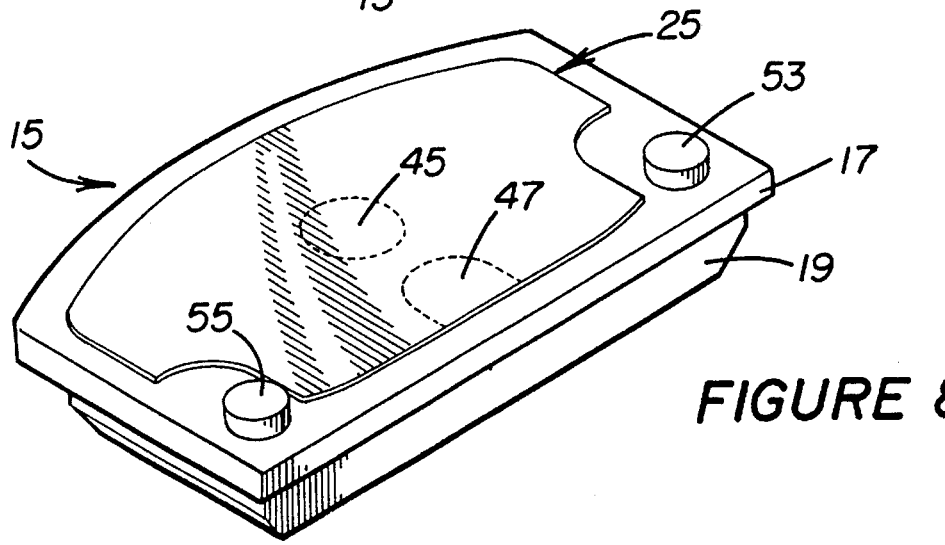
FIGURE 8

SHIM STRUCTURE FOR SOUND DAMPENING BRAKE SQUEAL NOISE

The Aluminum Association of Washington D.C. writes standards for aluminum used by industries in the United States. Applicant uses Aluminum Alloy No. 1145 and Temper No. H19 of the Aluminum Association standards for the aluminum shim of the present invention. The chemical properties (in percent) of the alloy are Al 99.45%, Cu 0.05%, Mn 0.05%, Mg 0.05%, Zn 0.05%, Ti 0.03%, and the balance is Si and Fe and other chemicals. The ultimate tensile strength is 21,000 pounds per square inch. The elongation (in 2 inches) is 5%. In addition, this aluminum material conforms to Federal Specification QQ-A-1876 of the General Services Administration (GSA) of the U.S. Government.

BACKGROUND OF THE INVENTION

This invention relates to a shim structure for sound dampening brake squeal noise in a disc brake apparatus.

In disc brake apparatus a rotatable rotor rotates with the axle of a wheel to be braked. Two friction pad structures are disposed on opposite sides of the rotor. Each friction pad structure comprises a steel backing and a brake pad. The friction pad structures are moved inwardly, toward one another, under the force supplied by a hydraulically actuated piston and related caliper fingers of a caliper mounting structure. The plates are moved outwardly, away from one another, by return springs.

When the piston and caliper fingers press the backing plates inwardly, the inner surfaces of the braking pads are engaged in frictional, braking contact with the rotor 13.

A relatively high pitched and undesired brake squeal noise can be produced during such braking engagement of the pads on the rotor.

The brake squeal noise is produced by vibration of the friction pad structures during braking actuation.

To reduce and/or to eliminate the undesired brake squeal noise, sound dampening shim constructions have been used, both by original equipment manufacturers and by brake repair shops.

The sound dampening shim constructions have been positioned both between the hydraulically actuated piston and the piston engaging surface of the related steel backing plate and also between the caliper fingers and the caliper contact surface of the related steel backing plate.

Various shim constructions have been used, and examples of certain ones of such shim constructions are referred to in more detail under the Detailed Description of the Preferred Embodiments portion of this application.

The previously used sound dampening shim constructions have had some good features and have had some features which are not so good.

It is a primary object of the present invention to construct a shim structure for sound dampening brake squeal noise which avoids problems presented by prior shim constructions and which has functional and marketing benefits not obtainable with prior shim constructions.

SUMMARY OF THE PRESENT INVENTION

A shim structure for sound dampening brake squeal noise in a disc brake apparatus and constructed in accordance with the present invention is installed as a sound dampening shim on the piston side surface and on the caliper contact surface of a steel backing plate of the friction pad structure. The shim structure, when installed on the steel backing plate, is composed of a sheet of aluminum and a continuous membrane of a high temperature acrylic adhesive on one surface only on the sheet of aluminum. The adhesive adheres the shim structure to the caliper contact surface of the steel backing plate.

The sheet of aluminum is long enough and wide enough to be configured to be engagable by the piston or caliper and to cover at least fifty percent of the area of the caliper contact surface of the steel backing plate.

The sheet of aluminum has a thickness large enough to provide, in combination with the membrane of high temperature acrylic adhesive, effective sound dampening of the brake squeal noise. The sheet of aluminum, in one specific embodiment of the invention, has a thickness small enough to permit the sheet of aluminum to be trimmed by scissors without upsetting the cut edge from the flat condition of the sheet. This insures that there is no crimping of a cut edge so that, if it is necessary to trim the shim to fit a particular backing plate, all edges of the shim structure will lie flat and be in secure contact with the backing plate, to thereby enhance the sound dampening qualities.

In another specific embodiment of the present invention the silhouette periphery of the shim structure is shaped to closely match the silhouette of a number of related but differently configured friction pad structures. In this embodiment the sheet of aluminum is at least partially cut through in certain locations to permit the areas of those locations to be popped out by underlying and upwardly projecting protuberances in the surface of the backing plate when the shim structure is pressed into engagement with the surface of the backing plate during installation.

This embodiment of the invention has the benefit that one basic shim structure can be fitted to a plurality of friction pad structures having varied surface configurations, and no trimming of the shim structure with scissors is required to install the shim structure.

A relatively small number of specific silhouette peripheral configurations of the shim structure can be adapted, by use of the pop-out areas, to fit a large number of varied silhouette configurations of friction pad structures. This substantially reduces the number of specific silhouette peripheral configurations of shim structures which are required to be maintained in stock in order to provide a substantially custom fit on the large number of varied silhouette configurations of friction pad structures.

This is an important feature, because there are over three hundred variations of friction pad structures. The present invention enables only a relatively few (about twelve) configurations of shim structures to provide substantially custom fits on the large number (about three hundred) of configurations of friction pad structures.

Methods and apparatus which incorporate the features described above and which are effective to function as described above constitute further, specific objects of the invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 shows how a shim structure constructed in accordance with one embodiment of the present invention is incorporated in the disc brake apparatus for dampening brake squeal noise.

Figure 2:
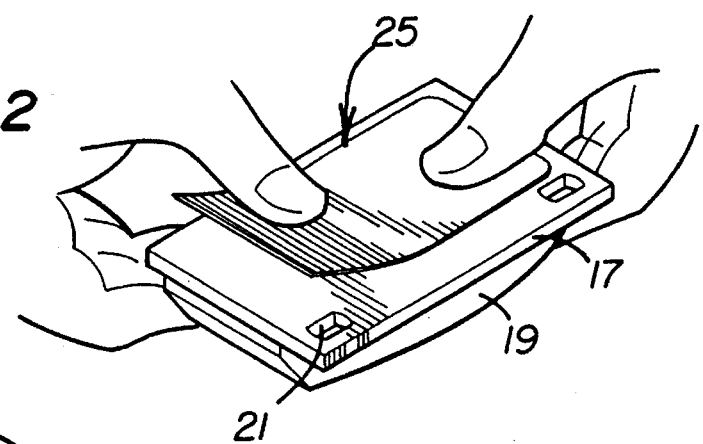
FIG. 2 is a pictorial view showing how a shim structure constructed in accordance with one embodiment of the present invention is manually installed on the caliper contact side surface of a friction pad structure.

FIG. 5 is a pictorial view, like FIG. 2, but showing the installation of a shim structure constructed in accordance with another embodiment of the present invention. The embodiment of the shim structure shown in FIGS. 5–8 has pop-out areas formed by partial cuts through the sheet of aluminum so that some or all of the pop-out areas can be popped out of the sheet of aluminum in the course of installing the shim structure on the caliper contact side surface of the friction pad structure. The pop-out areas permit a single silhouette periphery of a shim structure to be used on a plurality of related but differently configured friction pad structures. The pop-out areas permit portions of the outer peripheral configuration to be modified as needed, and also permit certain internal areas to be popped out by underlying and upwardly projecting protuberances in the caliper contact side surfaces of friction pad structures when the shim structure is pressed down into place during installation. If the particular friction pad structure does not have protuberances which pop out all of the pop-out areas then those areas which are not popped out remain in place and are adhered to the friction pad structure by the membrane of adhesive to provide sound dampening in those un-popped-out areas.

FIGS. 6 and 7 are respective plan and end elevation views showing how one pop-out area is popped out during installation by a protuberance located at about the mid-point of one side periphery of the shim structure.

FIG. 8 is an isometric view showing how the same shim structure shown in FIGS. 5, 6 and 7 provides an effective, substantially custom fit on a friction pad structure having protuberances located in two corners of the friction pad structure, rather than in the middle part of the periphery like the friction pad structure shown in the FIGS. 5, 6 and 7.

DETAILED DESCRIPTION OF THE PREFERRED EMBODIMENTS

Figure 1:
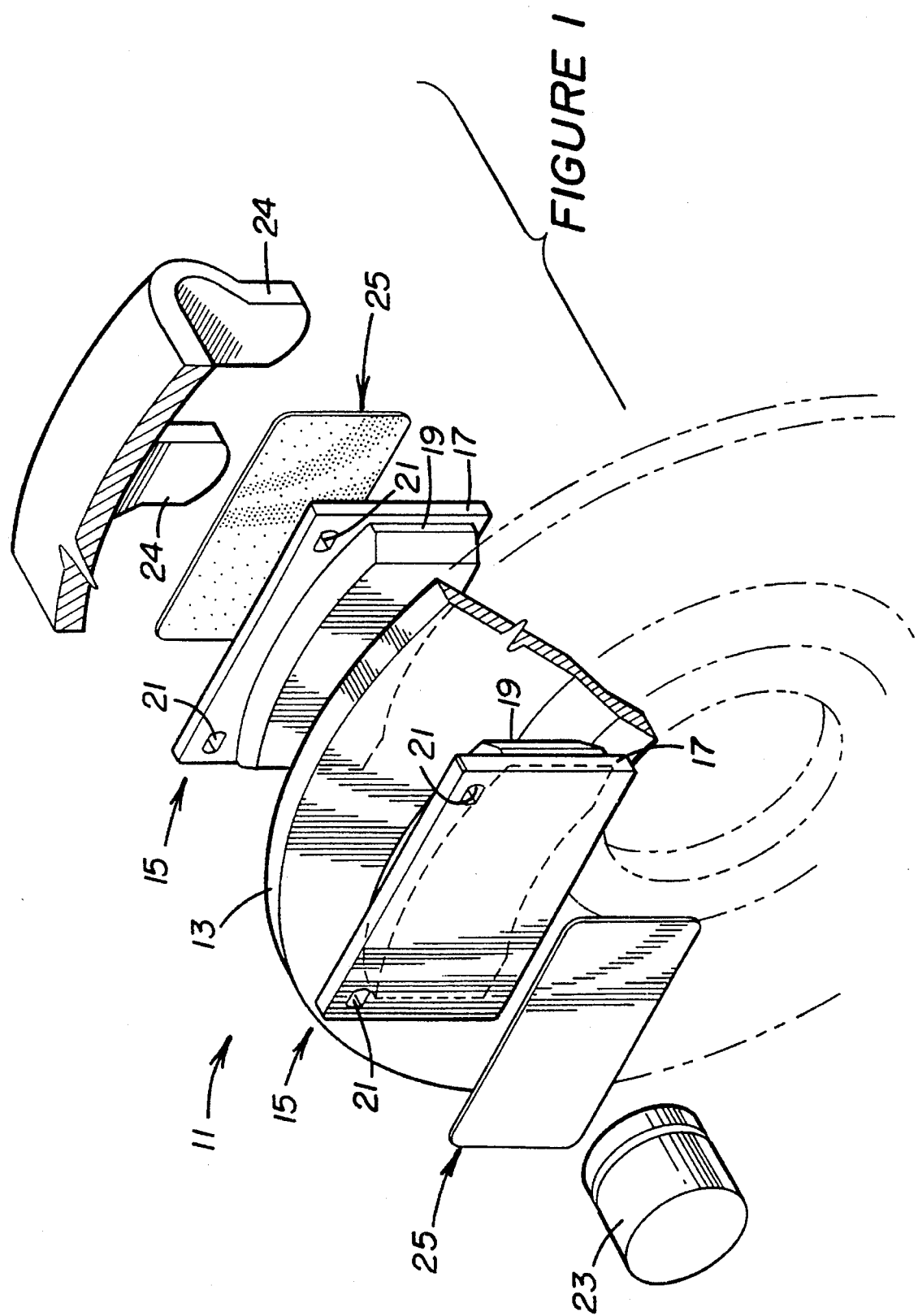
FIG. 1 is an exploded, isometric view of a disc brake apparatus.

FIG. 1 is an exploded, isometric view of a disc brake apparatus indicated generally by the reference numeral 11 in FIG. 1.

The disc brake apparatus 11 comprises a rotatable rotor 13 which rotates with the axle of a wheel to be braked.

The disc brake apparatus also includes two friction pad structures 15. Each friction pad structure comprises a steel backing plate 17 and a brake pad 19 which is mounted on the rotor side of the steel backing plate.

The two backing plates 17 are suspended in a conventional caliper mounting structure (not shown in FIG. 1) by rods which extend through openings 21 in the upper corners of the backing plates 17. This caliper mounting permits the backing plates to move axially on the support rods.

The plates are moved inwardly toward one another under the force applied by a hydraulically actuated piston 23 and the related caliper fingers 24.

When the piston 23 and fingers 24 press the backing plates inwardly, the inner surfaces of the braking pads 19 are engaged in frictional, braking contact with the rotor 13.

A relatively high pitched and undesired brake squeal noise can be produced during such braking contact.

A brake squeal noise often occurs after the brake pads 19 are replaced.

Brake squeal noise can, however, occur at other times for a variety of reasons.

The brake squeal noise is, as noted above, of a relatively high frequency, and it is produced by vibration of a friction pad structure 15 during braking actuation.

The vibration can be produced during the burnishing in process of the friction pads 19 on the rotor 13. There is a certain amount of porosity in the surfaces of both the rotor and the brake pads 19. The porosity of the surfaces can produce vibrations in the friction pad structures 15 until the inter-engaged surfaces have been rubbed together sufficiently long to eliminate or to substantially reduce the porosity and to become burnished surfaces.

The back surface of the steel backing plate 17 can also have a certain amount of unevenness in finish which can present high spots engagable with the piston 23 and/or caliper fingers 24; and this can also lead to some undesired vibrations of the friction pad structures 15.

In efforts to reduce and/or to eliminate the undesired brake squeal noise sound dampening shim constructions have been used, both by original equipment manufacturers and by brake repair shops.

The sound dampening shim constructions have been positioned between the hydraulically actuated piston 23 and the piston facing surface of the friction pad structure 15 and between the caliper fingers 24 and the calipers contact surface of the associated friction pad structures 15.

Various shim constructions have been used.

For example, U.S. Pat. No. 4,093,045 to Kawamura issued Jun. 6, 1978, discloses a shim construction which is unfixedly interposed between the piston and the friction pad structure and which has a cut out portion in the shim and which also has a PTFE coating of friction reducing material on at least one side of the shim.

U.S. Pat. No. 4,603,760 to Myers issued Aug. 5, 1986, also discloses a shim construction having a slot in a steel insulator sheet secured to a backing plate by rivets or adhesive or both.

U.S. Pat. No. 4,225,021 to Kawamura, et al. issued Sep. 30, 1980, discloses a shim consisting solely of a metallic material selected from the group consisting of aluminum, aluminum based alloys and brass and free of all coatings and interposed between the piston and the friction pad structure without any intervening substances.

U.S. Pat. No. 3,885,651 to Odier issued May 27, 1975, interposes a sandwich structure of rubber and steel or aluminum which is glued between the backing plate and the friction pad and further uses a corrugated spring engaged with one end edge surface of the backing plate to dampen vibrations.

U.S. Pat. No. 3,918,555 to Rath issued Nov. 11, 1975, uses a strip of substantially incompressible material which can be a metal, for example, aluminum, coated on both side faces with a layer of adhesive, preferably an adhesive based on uncured rubber embedded in silk protected by peel-off layers of oiled paper. The layers of adhesive coating both sides of the strip of substantially incompressible material (as defined in claim 1 in U.S. Pat. No. 3,918,555) attach the friction pad assembly to the backing plate. The U.S. Pat. No. 3,918,555 also discloses that a sound dampening shim construction having one or more metal layers coated with two, outer adhesive layers can be interposed between the piston and the friction pad structure to damp any relative movement, radial or circumferential between the piston and the friction pad structure.

U.S. Pat. Nos. 4,093,045; 4,603,760; 4,225,021; 3,885,651; and 3,918,555 are incorporated by reference in accordance with the provisions of Section 608.01(p)B of the Manual of Patent Examining Procedures of the United States Patent and Trademark Office.

The specification sheets for Scotch laminating adhesives sold under the Scotch Brand numbers 966, 9462, 941, 967, and 968 and published by the 3M Converter Specialties Division of 3M (copies of which specification sheets were submitted with this application, as filed, as enclosures 1 and 2 of Appendix A) are also incorporated by reference in accordance with Section 608.01(p)B of the Manual of Patent Examining Procedures of the United States Patent and Trademark Office.

All of the sound dampening shim constructions noted above have some good features and have some features which are not so good.

The shim structure of the present invention is indicated by the reference numeral 25 in the various figures of the drawing.

The shim structure 25 of the present invention is constructed in two embodiments—one embodiment shown in FIGS. 1–4 and a second embodiment shown in FIGS. 5–8.

The embodiment shown in FIGS. 1–4 is large enough to cover all or substantially all of the piston side or caliper contact surface of larger friction pad structures and is trimmed with scissors to fit smaller ones of the friction pad structures.

The embodiment shown in FIGS. 5–8 is constructed to have a silhouette periphery which is shaped to closely match the silhouettes of a number of related but differently configured friction pad structures. The embodiment shown in FIGS. 5–8 is formed with one or more partially cut through locations to permit the areas of those locations to be popped out, by underlying and upwardly projecting protuberances in the piston side or caliper contact surface of the friction pad structure, when the shim structure is pressed in the engagement of the surface of the friction pad structure during installation.

The embodiment shown in FIGS. 5–8 enables one basic shim structure to be fitted to a plurality of friction pad structures having varied surface configurations, and no trimming of the embodiment of the shim structure shown in FIGS. 5–8 is normally required to install the shim structure on the surface of any of the related but differently configured friction pad structures, as will be described in more detail below.

The embodiment of the shim structure shown in FIGS. 5–8 permits a relatively small number of specific silhouette peripheral configurations of the shim structure to be adapted, by use of the pop-out areas, to fit a large number of varied silhouette configurations of friction pad structures. This substantially reduces the number of specific silhouette peripheral configurations of shim structures that are required to be maintained in stock in order to provide substantially custom fits on a large number of varied silhouette configurations of friction pad structures.

In each embodiment of the shim structure of the present invention the shim structure is very simple in construction and is readily installed.

Each embodiment of the shim structure is effective to produce the desired sound dampening, because of the materials and construction of the shim structure and also because of the amount of surface covered by the shim structure on the backside of the backing plate, as will be described in more detail below.

Both embodiments of the shim structure of the present invention are quite low in cost and facilitate marketing. A single shim structure, in the embodiment shown in FIGS. 1–4, can be fitted to substantially all friction pad structures. Only a relatively few (about a dozen) specific silhouette configurations of the shim structure of the embodiment shown in FIGS. 5–8 are sufficient to provide substantially custom fits on substantially all of the relatively large number (almost 300) of varied silhouette configurations of friction pad structures presently being used.

Figure 4:
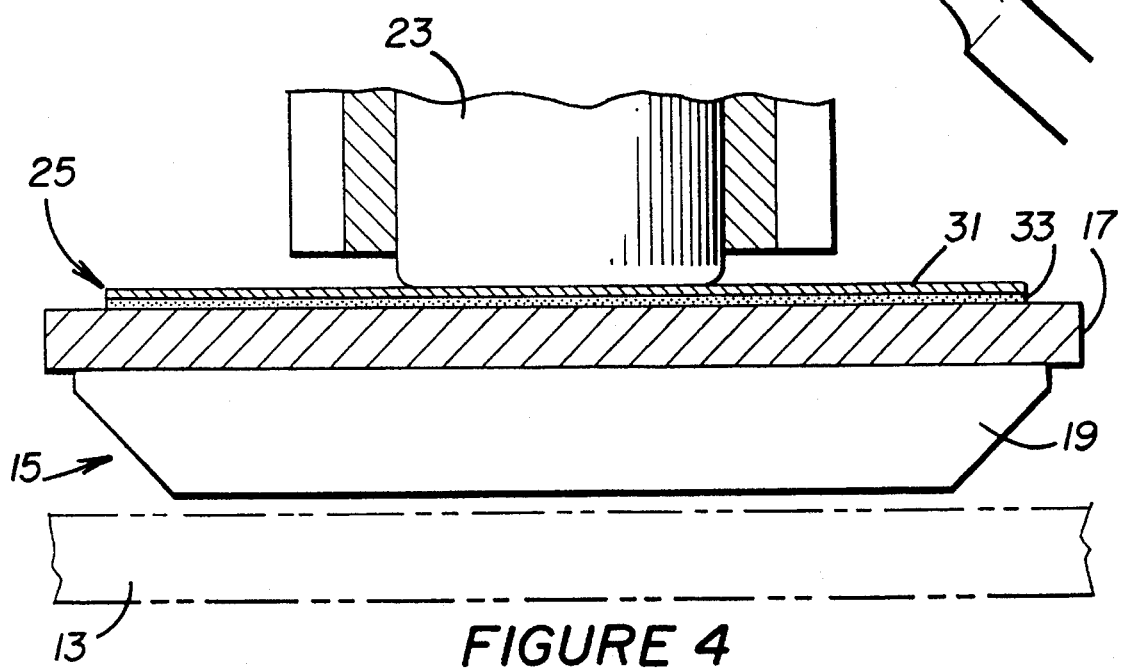
FIG. 4 is an enlarged, side elevation view, partly in cross section, showing details of the shim structure as installed as a sound dampening shim on the caliper contact side surface of the friction pad structure of the disc brake apparatus shown in FIG. 1.

As best shown in FIG. 4, all embodiments of the shim structure of the present invention are composed of only two elements when installed as a sound dampening shim on the piston side surface of the backing plate 17. The shim structure of the present invention, when so installed, is composed of a sheet of aluminum 31 and a continuous membrane 33 of a high temperature acrylic adhesive on one surface only on the sheet of aluminum 31. The membrane of the high temperature acrylic adhesive 33 adheres the aluminum sheet 31 to the surface of the backing plate 17 as shown in FIG. 4.

In all embodiments of the present invention the sheet of aluminum 31 is long enough and wide enough to be engagable by the piston 23 and/or caliper fingers 24 and to cover at least fifty percent of the area of the surface of the backing plate.

The sheet 31 of aluminum has a thickness which is large enough to provide, in combination with the membrane of high temperature acrylic adhesive, effective sound dampening of the brake squeal noise. The larger the area of coverage by the shim structure the better the sound dampening effect is.

The aluminum sheet is "half hard" aluminum. This material is hard enough to be non compressible by the force exerted by the hydraulic piston 23 and the caliper fingers 24, but the material is soft enough to effectively absorb imperfections in the back surface of the steel backing plate 17 so as effectively to minimize or to eliminate having the piston 23 and/or caliper fingers 24 engaged with any high spots.

A thickness of 0.1 millimeters to 0.2 millimeters is preferred for the embodiment which is trimmed by scissors while a thickness of 0.5 millimeters is preferred for the embodiment shown in FIGS. 5–8 which is partially cut through in certain locations.

The combination of the aluminum sheet 31 and the membrane of the high temperature acrylic adhesive 31 effectively sound dampens vibrations and brake squeal noise which would otherwise be transmitted by the steel backing plate 17. The combination lowers such noise to a frequency and sound level in which no brake squeal noise is heard by occupants of the car.

The aluminum material also functions to radiate heat more rapidly from the friction pad structure 15 than would be the case if the heat were radiated solely from the steel backing plate 17.

Figure 3:
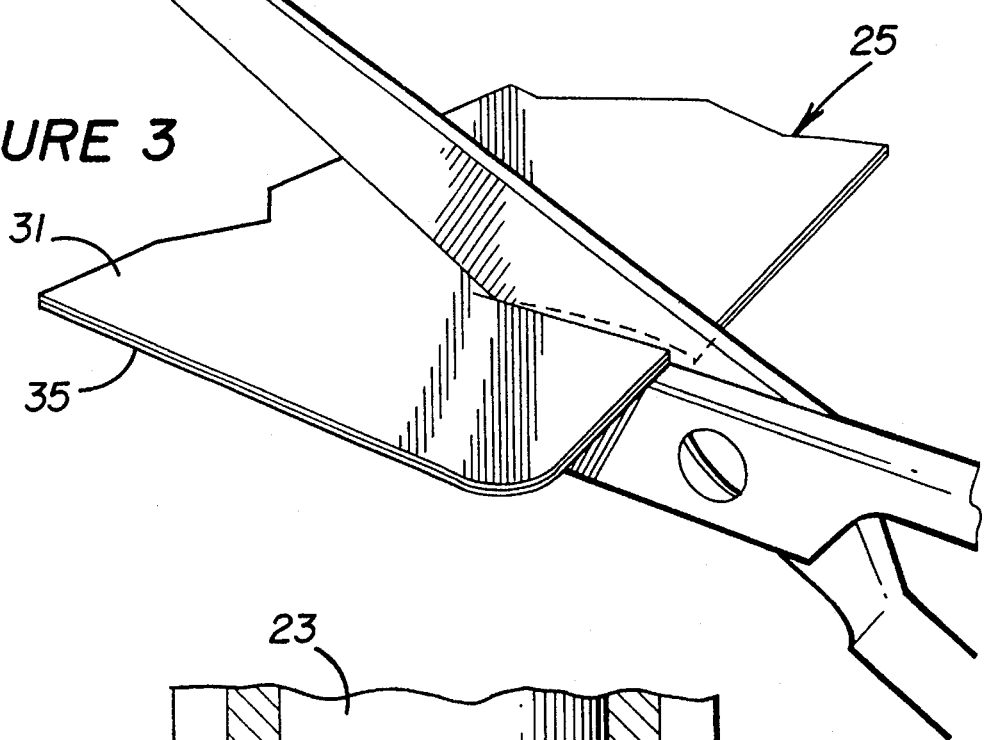
FIG. 3 is a pictorial view showing how the sheet of aluminum of the shim structure of the present invention can be cut with scissors without upsetting or crimping of the cut edge from the flat condition.

It is an important feature of the present invention that while the sheet of aluminum has a thickness large enough to provide effective sound dampening, the sheet of aluminum 31 also has a thickness small enough to permit the aluminum to be trimmed by scissors (as shown in FIG. 3) without upsetting or crimping the cut edge from the flat condition of the sheet. Any crimping or upset from the flat condition works against holding the trimmed edge flat against the backing plate 17. To be an effective sound dampening shim, all of the area of the shim should be adhered continuously and firmly to the backing plate without any loose edges.

The preferred range of thickness of the sheet of aluminum 31 is in the range of 0.1 millimeters to 0.5 millimeters.

In a specific form of the shim shown in FIGS. 1–4 the thickness of the aluminum sheet is between 0.1 and 0.2 millimeters.

The membrane of adhesive has a thickness of at least 1 mil. The membrane of adhesive may have greater thickness but the cost increases as greater thicknesses are used. Three high temperature acrylic adhesive products which are commercially available from one manufacturer, Minnesota Mining and Manufacturing (3M), as their model numbers 966, 967 and 968 have adhesive thicknesses of 2.0 mils (51 microns, 0.05 millimeters, 0.002 inches) for model numbers 966 and 967 and 5.0 mils (127 microns) for model number 968. See Enclosure 1 and Enclosure 2 of Appendix A. All of these commercially available high temperature acrylic adhesives have been found suitable for use in the embodiments of the present inventions.

The shim structure of the present invention includes, prior to installation on the friction pad structure, a peel-off paper backing which is removably adhered to the membrane adhesive 33 so that the shim structure with the peel-off paper backing can be packaged, handled and/or trimmed by scissors prior to installation on the friction pad structure 31, without problems of sticking to the adhesive 33.

In FIG. 3 this paper backing is indicated by the reference numeral 35.

FIG. 2 shows how the shim structure 35 is manually applied to the back surface of the backing plate 17 after the peel-off paper backing 35 has been removed.

There are a large number (approximately 300) designs of friction pad structures 15 which are currently in use in disc brake apparatus on automobiles. This variety of designs and configurations presents a problem in manufacturing, distributing, displaying and stocking shim structures that can be installed on each particular friction pad structure design.

It is an important benefit of the present invention that only a relatively few (about 12) specific silhouette periphery configurations of shim structures constructed in accordance with the embodiment shown in FIGS. 5–8 need be stocked in order to provide substantially custom fits on the large number (about 300) of varied silhouette configurations of the friction pad structures 31.

This benefit is achieved in accordance with the present invention by first of all shaping the peripheral silhouette of the shim structure 25 to closely match the silhouettes of a number of related but differently configured friction pad structures 31 and then additionally partially cutting through the sheet of aluminum 31 in certain locations to provide pop-out areas at those partially cut through locations. The pop-out areas at the partially cut through locations permit those areas to be popped out by underlying and upwardly projecting protuberances (such as, for example, sensors, etc.) in the piston side and/or caliper contact surface of the friction pad structure when the shim structure 25 is pressed into engagement with that surface during installation of the shim structure.

As a result, one basic shim structure can be fitted to a plurality of friction pad structures having varied surface configurations, and no trimming of the shim structure with scissors is required to install the shim structure on any of said related, but differently configured friction pad structures.

The pop-out area can be located both on the periphery of the shim structure and in areas that are disposed inwardly, away from the periphery of the shim structure.

This embodiment of the present invention will now be described in more detail with specific reference to FIGS. 5–8.

As shown in these figures, a particular shim structure 25 is partially cut through with cuts 41, 42, 43 and 44 to provide respective pop-out areas 45, 46, 47 and 48. In installing the shim structure 25 on the configuration of the friction pad structure 15 shown in FIGS. 5, 6 and 7, the protuberance 51 causes the pop-out area 47 to be broken away and popped out (as best shown in FIG. 7) as the shim structure 51 is manually pushed down into engagement with the back surface of the backing plate 17. The other pop-out areas 45, 46 and 48 remain in place and are effective to provide sound dampening.

In the configuration of the friction pad structure 15 shown in FIG. 8, the protuberances 53 and 55 cause the pop-out areas 46 and 48 to be detached and popped out in the course of installing the shim structure 25. In the FIG. 8 configuration the pop-out areas 45 and 47 remain in position and remain effective to provide the desired sound dampening.

It should be noted that the disc brake apparatus shown in FIG. 1 is a single piston/caliper construction which is most commonly used. Other disc brake apparatus in use include apparatus which use two or more pistons. The shim structure of the present invention is equally effective for such other disc brake apparatus, and references to caliper contact surfaces in this application are intended to apply equally well to contact by either caliper fingers or single or multiple piston structures.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A shim structure for sound dampening brake squeal noise in a disc brake apparatus of the kind in which an actuator element of a piston/caliper structure is engagable with an outer, contact surface of a friction pad structure to press a rotor side surface of the friction pad structure against a rotatable rotor for exerting a frictional braking force on the rotor and wherein the brake squeal noise is of a relatively high frequency and is produced by vibration of the friction pad structure during braking actuation, said shim structure being composed of, a sheet of aluminum long and wide enough to be configured to be engagable by the actuator element of the piston/caliper structure and to cover at least fifty percent of the area of the outer, contact surface of a friction pad structure, and a continuous membrane of a high temperature acrylic adhesive on one surface only of the sheet of aluminum for adhering the shim structure to the outer, contact surface of the friction pad structure, said sheet of aluminum having a thickness large enough to provide, in combination with the membrane of high temperature acrylic adhesive, effective sound dampening of the brake squeal noise produced by vibration of the friction pad structure and having a thickness small enough to permit the sheet of aluminum to be trimmed by scissors without upsetting the cut edge from the flat condition of the sheet.

2. The invention defined in claim 1 wherein the thickness of the aluminum sheet is from about 0.1 to about 0.2 millimeters.

3. The invention defined in claim 2 wherein the membrane of adhesive has a thickness of about 2 mils.

4. The invention defined in claim 1 wherein the shim structure is large enough to cover most of the outer contact surface of larger friction pad structures but requires some trimming with scissors to fit smaller ones of the friction pad structures.

5. A shim structure for sound dampening brake squeal noise in a disc brake apparatus of the kind in which an actuator element of a piston/caliper structure is engagable with an outer, contact surface of a friction pad structure to press an inner rotor side surface of the friction pad structure against a rotatable rotor for exerting a frictional braking force on the rotor and wherein the brake squeal noise is of a relatively high frequency and is produced by vibration of the friction pad structure during braking actuation, said shim structure being composed of, a sheet of aluminum long and wide enough to be configured to cover at least fifty percent of the area of the outer, contact surface of a friction pad structure, and a continuous membrane of a high temperature acrylic adhesive on one surface only of the sheet of aluminum for adhering the shim structure to the outer, contact surface of the friction pad structure, said sheet of aluminum having a thickness large enough to provide, in combination with the membrane of high temperature acrylic adhesive, effective sound dampening of the brake squeal noise produced by vibration of the friction pad structure and wherein a silhouette periphery of the shim structure is shaped to closely match silhouette peripheries of a number of related but differently configured friction pad structures and wherein the sheet of aluminum is at least partially cut through in certain locations to permit the areas of those locations to be popped out so that one basic shim structure can be fitted to a plurality of friction pad structures having varied configurations of upwardly projecting protuberances in the outer, contact surface.

6. The invention defined in claim 5 wherein at least some of the pop-out areas are located on the periphery of the shim structure.

7. The invention defined in claim 5 wherein at least some of the pop-out areas are located inwardly, away from the periphery of the shim structure.

8. The invention defined in claim 5 wherein not all of the pop-out areas are pushed out of the shim structure during installation on a specific friction pad structure and wherein the pop-out areas which are not pushed out provide a sound dampening function, even though the pop-out areas are contained within partial cuts through the aluminum sheet.

* * * * *